(12) United States Patent
Frick

(10) Patent No.: US 8,746,119 B2
(45) Date of Patent: Jun. 10, 2014

(54) METHOD AND DEVICE FOR PROGRAMMING A PROJECTILE

(75) Inventor: Henry Roger Frick, Hettlingen (CH)

(73) Assignee: Rheinmetall Air Defence AG, Zurich (CH)

( * ) Notice: Subject to any disclaimer, the term of this patent is extended or adjusted under 35 U.S.C. 154(b) by 177 days.

(21) Appl. No.: 13/563,803

(22) Filed: Aug. 1, 2012

(65) Prior Publication Data

US 2014/0007760 A1  Jan. 9, 2014

Related U.S. Application Data

(63) Continuation of application No. PCT/EP2011/000388, filed on Jan. 28, 2011.

(30) Foreign Application Priority Data

Feb. 1, 2010  (DE) .......................... 10 2010 006 528

(51) Int. Cl.
*F42C 11/06* (2006.01)
*F41G 9/00* (2006.01)
*F42C 17/04* (2006.01)

(52) U.S. Cl.
CPC ............... *F42C 17/04* (2013.01); *F42C 11/065* (2013.01)
USPC ..................... 89/6.5; 89/6; 102/214; 102/207

(58) Field of Classification Search
CPC ............................. F42C 17/04; F42C 11/065
USPC .................... 89/6.5, 6; 102/214, 207
See application file for complete search history.

(56) References Cited

U.S. PATENT DOCUMENTS

| | | | |
|---|---|---|---|
| 4,144,815 A | 3/1979 | Cumming et al. | |
| 5,894,102 A | 4/1999 | Oberlin et al. | |
| 7,506,586 B1 | 3/2009 | Pereira et al. | |
| 7,825,850 B2 | 11/2010 | Frick | |
| 2007/0074625 A1 | 4/2007 | Seidensticker et al. | |
| 2008/0211710 A1* | 9/2008 | Frick ............................ | 342/104 |
| 2009/0289619 A1 | 11/2009 | Frick | |
| 2010/0308152 A1 | 12/2010 | Seidensticker | |
| 2014/0007759 A1* | 1/2014 | Frick ............................... | 89/6.5 |
| 2014/0060297 A1* | 3/2014 | Frick ............................... | 89/6.5 |

FOREIGN PATENT DOCUMENTS

| | | |
|---|---|---|
| CH | 691 143 A5 | 4/2001 |
| DE | 10 2006 058 375 A | 6/2008 |
| DE | 10 2009 024 508 A1 | 7/2011 |
| EP | 1 726 911 A1 | 11/2006 |
| WO | WO 2009/085064 A2 | 7/2009 |
| WO | WO 2009/141055 A1 | 11/2009 |

\* cited by examiner

*Primary Examiner* — Michael David
(74) *Attorney, Agent, or Firm* — Muncy, Geissler, Olds & Lowe, P.C.

(57) ABSTRACT

An inductive or capacitative programming of a projectile is disclosed. A waveguide is used for the programming, the electromagnetic field being concentrated in the waveguide. The used programming unit includes at least one waveguide which is preferable located and/or integrated in the region of the muzzle, for example in front of the muzzle brake. A transmission coupler for the transmission is fed by a signal generator. The information relating to the projectile is modulated to the carrier frequency in the modulator. A reception coupler integrated on/in the projectile is electrically interconnected to a store or processor in the projectile. The reception coupler receives the modulated signal and transmits it to the processor which is where the eventual programming takes place.

11 Claims, 3 Drawing Sheets

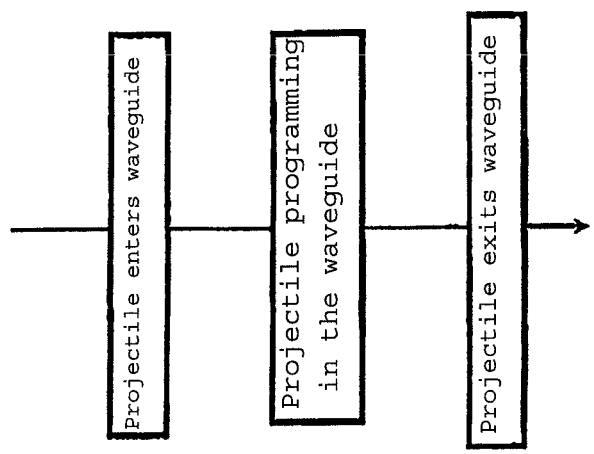

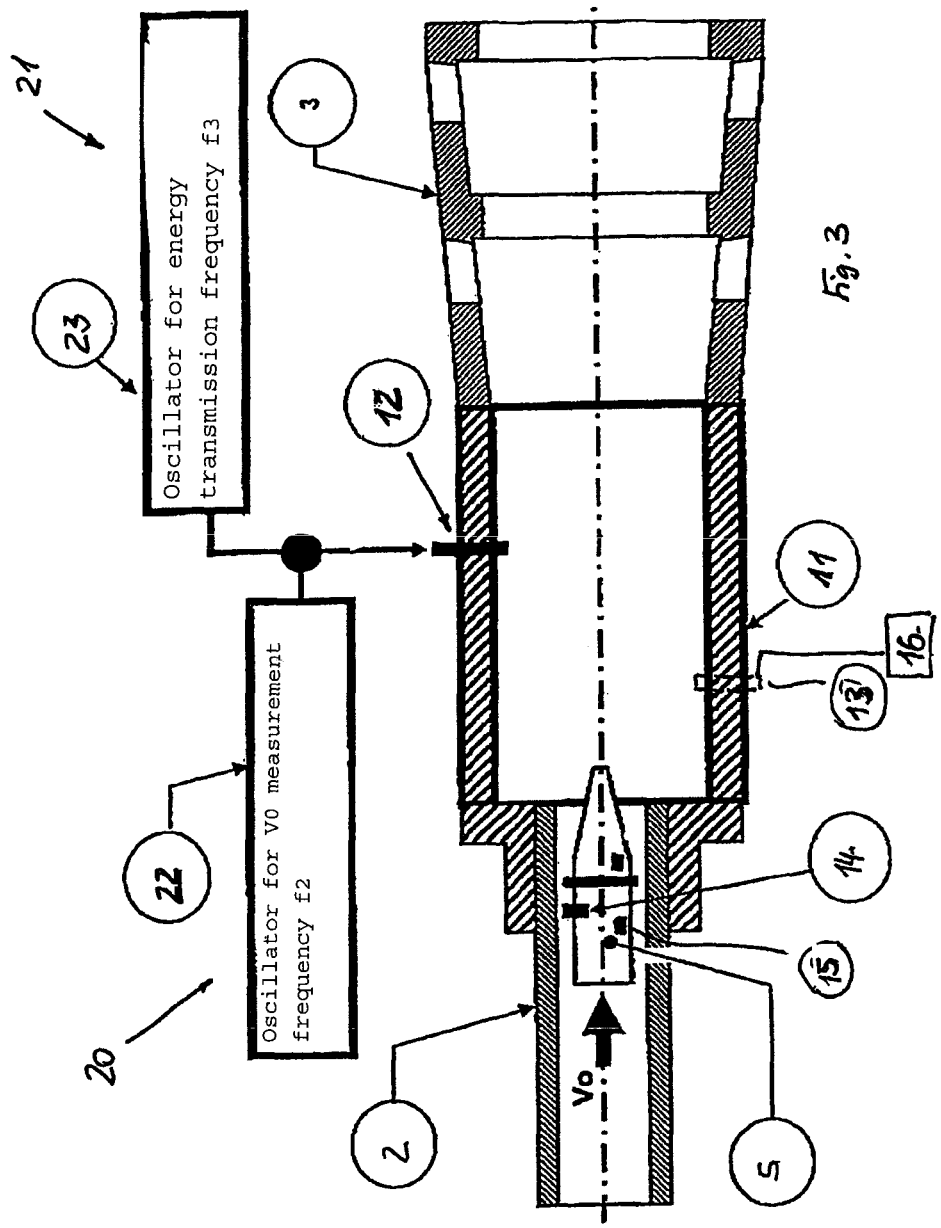

METHOD AND DEVICE FOR PROGRAMMING A PROJECTILE

This nonprovisional application is a continuation of International Application No. PCT/EP2011/000388, which was filed on Jan. 28, 2011, and which claims priority to German Patent Application No. DE 10 2010 006 528.5, which was filed in Germany on Feb. 1, 2010, and which are both herein incorporated by reference.

BACKGROUND OF THE INVENTION

1. Field of the Invention

The invention relates to the problems of programming a projectile during passage through the barrel and/or passage through the muzzle brake. The associated device is suitable, moreover, for a $V_0$ measurement and, to round out the whole, is also suitable for transmitting energy to the projectile.

2. Description of the Background Art

For programmable ammunition, information must be communicated to the projectile—which is to say programmed into it—concerning its detonation time and/or flight path. In systems in which the detonation time is calculated from the measured muzzle velocity $V_0$, the information can be relayed no earlier than at the muzzle and/or in flight. If the programming takes place prior to exit from the gun barrel, as a general rule the projectile flies past a programming unit at the muzzle velocity $V_0$ and thus is in motion relative to the programming unit.

A known programming unit is described in CH 691 143 A5. With the aid of a transmitting coil, the information is transmitted inductively via a matching coil in/on the projectile. This programming unit has a heavy construction, which can adversely affect the gun on account of the mass and the torque. At the same time, an unshielded transmitting coil of the programming unit can result in unwanted radiation, since the coil also acts as an antenna. The radiated signal can be detected, and conclusions concerning the location of the gun can be drawn therefrom.

A method is known from WO 2009/085064 A2 in which the programming is undertaken by the transmission of light beams. To this end, the projectile has optical sensors on its circumference.

DE 10 2009 024 508.1, which corresponds to US 20100308152, and which is incorporated herein by reference, concerns a method for correcting the trajectory of a round of terminal phase-guided ammunition, specifically with the projectile imprinting of such projectiles or ammunition in the medium caliber range. It is proposed therein to separately communicate with each individual projectile after a firing burst (continuous fire, rapid individual fire) and in doing so to transmit additional information regarding the direction of the earth's magnetic field for the individual projectile. The projectile imprinting takes place using the principle of beam-riding guidance of projectiles. In this process, each projectile reads only the guide beam intended for that projectile, and can determine its absolute roll attitude in space using additional information, in order to thus achieve the correct triggering of the correction pulse.

Alternative transmission possibilities, for example by means of microwave transmitters, are known to those skilled in the art from EP 1 726 911 A1, which corresponds to US 20070074625, and among other sources.

While programming during flight is indeed technically possible as a result, it nevertheless is also subject to simple interference.

SUMMARY OF THE INVENTION

It is therefore an object of the invention to create a system that allows for optimal programming with simple construction.

The invention is based on the idea of carrying out the programming inductively and/or capacitively during the projectile's passage through the gun barrel or muzzle brake. It is proposed to use a waveguide for the programming, since the electromagnetic field in a waveguide is concentrated.

The utilization of a waveguide below the cutoff frequency to measure the muzzle velocity of a projectile or the like is already known from DE 10 2006 058 375 A, which corresponds to U.S. Pat. No. 7,825,850, which are herein incorporated by refernce. This document proposes using the gun barrel or launcher tube and/or parts of the muzzle brake as a waveguide (a tube with a characteristic cross-sectional shape that has a wall with very good electrical conductivity is considered a waveguide. Primarily square and round waveguides are widely used as a technology), which, however, is operated below the cutoff frequency of the applicable waveguide mode. WO 2009/141055 A, which corresponds to US 20090289619, and which is incorporated herein by reference, carries this idea further and combines two methods of measuring $V_0$.

The waveguide is now used not (only) for the $V_0$ measurement, but, in accordance with the invention, for the programming as well. In addition to the waveguide, the programming system or programming device has a transmitting coupler for the programming that is powered by a signal generator. The projectile to be programmed has a receiving coupler for the programming that is functionally connected to the transmitting coupler. Also located in the projectile is at least one programmable processor, etc., which evaluates the signal picked up by the receiving coupler and programs the projectile. In a preferred embodiment, the programming can be verified with the aid of a test signal from a receiving coupler functionally connected to the waveguide.

The waveguide for the programming can be the gun barrel, the muzzle brake, or an additional part between the end of the gun barrel and the start of the muzzle brake, or can also be attached to the end of the muzzle brake. Incorporation in the region before the opening of the muzzle brake has proven to be preferred when an energy transmission to the projectile or shell is also provided, for example.

As in the case of the $V_0$ measurement, the signal generator (e.g., oscillator) supplies a signal with a constant center frequency that lies below the lowest cutoff frequency of the waveguide. As a function of the geometry and type of the transmitting coupler (coil, dipole, etc.), multiple waveguide modes ($TE_{mn}$ where m=0, 1, 2, . . . and n=1, 2, 3, . . . ) are excited. The signal generator generates either a carrier in continuous-wave operation (CW operation) or a modulated signal.

If provision is made to perform the $V_0$ measurement with the aid of the one or more waveguides, the programming must take place after the $V_0$ measurement. It has likewise proven to be preferred here to incorporate the waveguide for the programming after the muzzle brake.

The muzzle velocity $V_0$ itself preferably can be measured or determined before and/or after the projectile. In the case of measurement before the projectile, the fact is taken into account that the tip of the projectile influences the magnetic field when passing through the waveguide. In the case of measurement after the projectile, the essentially flat or planar surface of the base is exploited, by which means the measurement takes place independently of the shape of the tip of the projectile. In this process, the base influences the electromagnetic field. In each case, this change is sensed by a receiving coupler and supplied to an analysis device. Such a method is known from WO 2009/141055 A1. The distance between a transmitting coupler, which for its part receives the signals from the oscillator, and the receiving coupler is variable and can be chosen individually as a function of the mode selection of the waveguide, but depends on the caliber, the interior dimensions of the waveguide, and the frequency.

Furthermore, the device can be augmented or combined with an energy transmission system. For programmable ammunition, the projectile must be supplied with energy for the electronics integrated therein and for starting the detonating train. The transmission preferably takes place inductively and/or capacitively, to which end the waveguide can be used. For the energy transmission, a transmitting coupler that is already present, or an additional transmitting coupler, is used; this coupler applies the requisite energy in the form of a third frequency to a sensor in the projectile, which in turn charges a storage device that is electrically connected to the sensor. For its part, the energy transmission must take place before the programming, so it has proven to be preferred for the waveguide for the programming to be affixed to the end of the muzzle brake, with the result that the spacing between the energy transmission and the programming is sufficient to carry out the programming.

As a result of the field concentration in the waveguide, less supply energy is required for the necessary signal-to-noise ratio (S/N). On account of the choice of the frequency below the cutoff frequency, only a small amount of radiation to the outside is present, and the programming is more resistant to interference.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a flow chart for depicting the programming sequence; and

FIG. 3 illustrates an extension of the device with a $V_0$ measurement and also with an energy transmission device.

DETAILED DESCRIPTION

Figure 1:
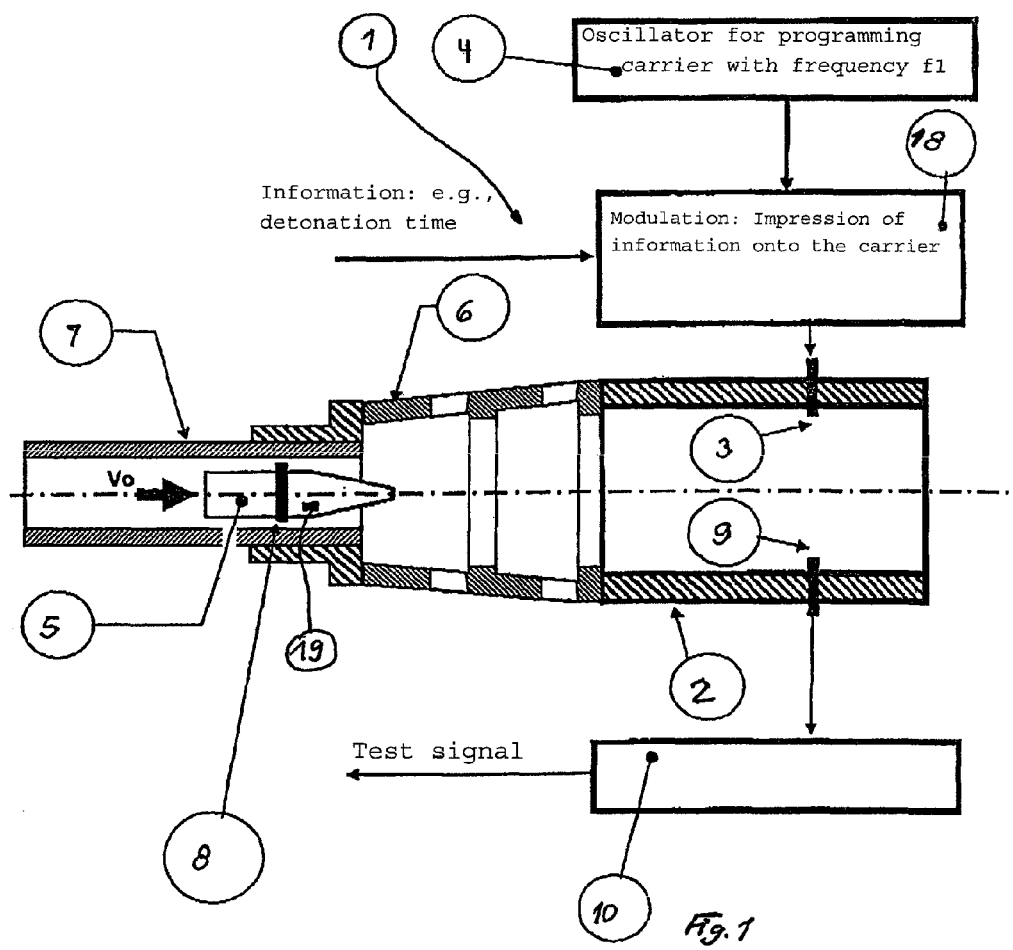
FIG. 1 illustrates a programming unit.

FIG. 1 shows a programming unit or programming device 1. The programming unit 1 includes at least one waveguide 2 or waveguide segment(s), as well as at least a transmitting coupler 3 that is supplied with a frequency $f_1$ by an oscillator 4. The reference number 5 identifies a projectile into which the requisite information—e.g., detonation time—is to be impressed during transit through the programming unit 1. The waveguide 2 in this design can be placed after (viewed in the direction of firing) a muzzle brake 6 (if present), or can be incorporated between the muzzle brake 6 and a gun barrel 7 (see FIG. 4; similar to the device for energy transmission when this is not incorporated).

The mode of operation, or the method for programming, is as follows:

The signal with frequency $f_1$ is below the cutoff frequency of the relevant waveguide mode. So that the programming is independent of the magnitude of the muzzle velocity $V_0$, the frequency should be >0 Hz. This has the result that the $V_0$ of slow projectiles as well as fast projectiles has no effect on the programming. The carrier with the frequency $f_1$ is modulated (18) with the information, and the modulated signal is then provided to the transmitting coupler 3. The transmitting coupler 3 now excites or stimulates the corresponding electromagnetic field in the waveguide 2. When the projectile 5 passes through the waveguide 2, the projectile 5 receives the signal in a contactless manner with capacitive and/or inductive coupling by means of a receiving coupler 8 located in the projectile 5. Suitable for this purpose are, for example, a coil on the projectile or shell 5, a dipole incorporated into/on the projectile 5, or also a slot antenna (slot(s) is/are incorporated into the surface), etc. In the projectile 5, a processor 19 or the like that carries out the programming in the projectile 5 is electrically connected to the receiving coupler 8.

A test signal received by a receiving coupler 9 located in/on the waveguide 2 and transmitted by a receiving device 10 connected to the coupler 9 can be used for testing the programming, but is only conditionally necessary, so that this test could also be omitted. FIG. 2 shows the sequence of this programming in an overview.

In a further development, the programming can be combined with an energy transmission and/or a $V_0$ measurement. This is reflected in FIG. 3.

The frequencies $f_2$ and $f_3$ preferably are likewise optimized for both the $V_0$ measurement and energy transmission when the frequency used for both the measurement and the energy transmission (the same $f_2=f_3$) is already optimal.

Since the programming takes place at a point in time after the $V_0$ measurement, for example by means of a device 20, and after an energy transmission by means of the energy transmission unit 21, the components (couplers) for the measurement and transmission should be incorporated into the measurement and programming device ahead of the waveguide 2 for the programming in the direction of motion of the projectile. The incorporation of an additional waveguide 11 between the gun barrel 7 and an existing muzzle brake 2 has been shown to be a proven arrangement. This waveguide is a component of both the device 20 and the unit 21 in this design.

When the projectile 5 passes through the waveguide 11, the muzzle velocity $V_0$ is measured in a known manner by means of the transmitting coupler 12 and the receiving coupler 13. To this end, the transmitting coupler 12 is supplied with the frequency $f_2$ by a signal generator 22. The receive signal required for the measurement is received by the receiving coupler 13 and is passed to an analysis unit 16. The muzzle velocity determined therefrom can be provided to the programming unit 1 and modulated onto the carrier with the frequency $f_1$ via the modulator 18 as an information signal.

For the additional energy transmission, the projectile 5 has a sensor 14 that receives the signal with the frequency $f_3$ from an additional signal generator 23 and charges a storage device 15 in the projectile 5. As it flies through, the projectile 5 receives the requisite amount of energy, so that the storage device 15 is charged after exiting the waveguide or waveguide segment 11. The same transmitting coupler 12 can be used in this process; however, for the energy transmission it is preferably supplied by an additional signal generator 17.

The $V_O$ measurement can be carried out before and/or after the energy transmission. Both processes are to be carried out before programming, however.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for programming a projectile during passage through a gun barrel and/or a muzzle brake, via a programming unit, the method comprising:
    generating, via a signal generator, a carrier frequency that is adapted for the programming of the projectile;
    impressing the generated carrier frequency upon the projectile during the passage of the projectile through the gun barrel and/or the muzzle brake, wherein information for the programming has been modulated onto the carrier frequency; and
    performing the programming during passage through a waveguide that is operated below a cutoff frequency of the applicable waveguide mode.

2. The method according to claim 1, wherein a $V_O$ measurement of the projectile takes place in the waveguide via a frequency generated for the measurement, the measurement taking place chronologically before the programming.

3. The method according to claim 2, wherein an appropriate electromagnetic field is excited in the waveguide so that the frequency is reflected at the projectile and analyzed.

4. The method according to claim 1, wherein an energy transmission to the projectile takes place in the waveguide via a frequency generated for the energy transmission.

5. The method according to claim 1, wherein the frequency is greater than 0 Hz.

6. A device for programming a projectile during passage through a gun barrel and/or muzzle brake, the device comprising:
    a programming unit comprising at least one waveguide that is the gun barrel, the muzzle brake, or an additional part between an end of the gun barrel and a start of a muzzle brake, or is additionally attached to the end of the muzzle brake;
    at least one transmitting coupler that is supplied with a carrier frequency by a signal generator;
    at least one modulator, in which the information provided for the projectile is modulated onto the carrier frequency; and
    at least one receiving coupler incorporated on or in the projectile that is electrically connected to a storage device or processor in the projectile.

7. The device according to claim 6, wherein the receiving coupler is a coil on the projectile, a dipole incorporated into/on the projectile, and/or a slot antenna.

8. The device according to claim 6, wherein a receiving coupler and a receiving device connectable to the coupler are additionally incorporated, the signal of which is usable as a test signal for testing the programming.

9. The device according to claim 8, wherein components for a $V_O$ measurement and/or an energy transmission are incorporated ahead of the programming device, the components including a common waveguide.

10. The device according to claim 9, wherein the projectile has a sensor for the energy transmission that receives the signal with the frequency from the signal generator and charges a storage device in the projectile.

11. The device according to claim 9, wherein components for the $V_O$ measurement and/or an energy transmission, include transmitting couplers, receiving couplers, and signal generators of a measurement device and/or an energy transmission unit.

* * * * *